(12) United States Patent
Bera

(10) Patent No.: US 7,228,529 B2
(45) Date of Patent: Jun. 5, 2007

(54) RESTRUCTURING COMPUTER PROGRAMS

(75) Inventor: Rajendra K Bera, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 668 days.

(21) Appl. No.: 10/229,795

(22) Filed: Aug. 27, 2002

(65) Prior Publication Data
US 2004/0044994 A1    Mar. 4, 2004

(51) Int. Cl.
*G06F 9/45* (2006.01)

(52) U.S. Cl. .................................................... 717/137

(58) Field of Classification Search ......... 717/136–161
See application file for complete search history.

(56) References Cited

U.S. PATENT DOCUMENTS

| | | | | |
|---|---|---|---|---|
| 4,791,558 | A * | 12/1988 | Chaitin et al. | 717/140 |
| 5,586,329 | A * | 12/1996 | Knudsen et al. | 717/108 |
| 5,590,331 | A * | 12/1996 | Lewis et al. | 717/144 |
| 5,842,017 | A * | 11/1998 | Hookway et al. | 717/158 |
| 6,035,120 | A * | 3/2000 | Ravichandran | 717/141 |
| 6,091,897 | A * | 7/2000 | Yates et al. | 717/138 |
| 6,343,372 | B1 * | 1/2002 | Felty et al. | 717/136 |
| 6,502,237 | B1 * | 12/2002 | Yates et al. | 717/136 |

OTHER PUBLICATIONS

Lakhotia, et al., Restructuring programs by tucking statements into functions, Dec. 1, 1998, Information and Software Technology, vol. 40, No. 11, pp. 1-20.*
Komondoor, et al., Semantics-preserving procedure extraction, 2000, ACM, 1-58113-125-9/00/1, pp. 155-169.*
Griswold, W., Low-risk reengineering of lagacy systems, 2000, Univ. of California, Sandiago, Dept. of Computer Science & Engineering, pp. 1-4.*
Marshal, A., Template-based program restructuring, 1995, Middlesex College Computer Science Dept., pp. 1-12.*
Graunke, P., Automatically restructuring programs for the web, 2001, Northeastern Univ. Dept. of Computer Science, pp. 1-13.*

* cited by examiner

*Primary Examiner*—Tuan Dam
*Assistant Examiner*—Andre R Fowlkes
(74) *Attorney, Agent, or Firm*—Schmeiser, Olsen & Watts; William H. Steinberg

(57) ABSTRACT

Existing program is restructured based on a set of tasks that the existing program executes. A set of tasks is used, in conjunction with related test cases, to verify the correct functioning of the restructured program, and also to restructure the program. The restructuring process involves information about: (i) the tasks for which the original computer program is used, (ii) the inputs (including their valid ranges) to be provided to the program to accomplish the tasks, and (iii) the outputs generated by the program, known but unfixed bugs, etc. Legacy computer programs or applications for which reliable documentation is either not available or inadequate is desirably restructured for improved understanding and maintenance.

22 Claims, 25 Drawing Sheets

EXAMPLE 1 – FULL PROGRAM (1/3)

```
0.01   main()
0.02   {
0.03      float a, b, c, x, y;
0.04      int i, j;

0.05      get_input(i, j);
0.06      if (i == -1) then {
0.07         func5();
0.08         end;
0.09      }

0.10      else if (i > j) then {
0.11         get(a, b);
0.12         func1(a, b);
0.13         put_output(i, j, a, b);
0.14      }

0.15      else if (i < j) then {
0.16         get_input(b, c);
0.17         func2(b, c);
0.18         put_output(i, j, b, c);
0.19      }

0.20      else b = 2.0;

0.21      x = func3(b);
0.22      y = func4(b, 3);
0.23      put_output(x, y);
0.24   }

1.01   void func1(float u, float v)
1.02   {
1.03      if (u > v) then u = v;
```

FIG. 3

EXAMPLE 1 – FULL PROGRAM (2/3)

```
1.04      else v = u;
1.05      return;
1.06   }

2.01   void func2(float v, float w)
2.02   {
2.03      v = v + w + 4.0;
2.04      v = sin(v) + sin(w);
2.05      return;
2.06   }

3.01   float func3(float s)
3.02   {
3.03      while (s*s < 20) s++;
3.04      if (s > 0) then return sqrt(s);
3.05      else return abs(s);
3.06   }

4.01   float func4(float t, int n)
4.02   {
4.03      int j = (int)t - n;
4.04      switch (j) {
4.05         case 0:    ...; break;
4.06         case 1:    ...; break;
4.07         case 2:    ...; break;
4.08         case 3:    ...; break;
4.09         default: break;
4.10      }
4.11      return (float)j;
4.12   }

5.01   void func5(void)
5.02   {
```

FIG. 4

EXAMPLE 1 – FULL PROGRAM (3/3)

```
5.03    put_output("All calculations are over");
5.04    return;
5.05  }
```

FIG. 5

EXAMPLE 1 – RECAST IN CANONICAL FORM (1/3)

```
0.01   main()
0.02   {
0.03     float a, b, c, x, y;
0.04     int i, j;

0.05     get_input(i, j);
0.06     if (i == -1) then {
0.07       func5();
0.08       end;
0.09     }

0.10     else if (i > j) then {
0.11       get(a, b);
0.12       func1(a, b);
0.13       put_output(i, j, a, b);
0.14     }

0.15     else if (i < j) then {
0.16       get_input(b, c);
0.17       func2(b, c);
0.18       put_output(i, j, b, c);
0.19     }

0.20     else b = 2.0;

0.21     x = func3(b);
0.22     y = func4(b, 3);
0.23     put_output(x, y);
0.24   }

1.01   void func1(float u, float v)
1.02   {
1.03     if (u > v) then u = v;
```

FIG. 6

EXAMPLE 1 – RECAST IN CANONICAL FORM (2/3)

```
1.04     else v = u;
1.05     return;
1.06   }

2.01   void func2(float v, float w)
2.02   {
2.03     v = v + w + 4.0;
2.04     v = sin(v) + sin(w);
2.05     return;
2.06   }

// Canonical form of func3()

3.01   float func3(float s)
3.02   {
3.03     s1:
3.04     if (s*s < 20) then {
3.05        s++;
3.06        goto s1;
3.07     }

3.08     if (s > 0) then return sqrt(s);
3.09     else return abs(s);
3.10   }

// Canonical form of func4()

4.01   float func4(float t, int n)
4.02   {
4.03     int j = (int)t - n;
4.04     if (j == 0) then {. . .};
4.05     else if (j == 1) then {. . .};
4.06     else if (j == 2) then {. . .};
```

FIG. 7

EXAMPLE 1 – RECAST IN CANONICAL FORM (3/3)

```
4.07     else if (j == 3) then {. . .};
4.08     else {};
4.09     return (float)j;
4.10   }

5.01   void func5(void)
5.02   {
5.03     put_output("All calculations are over");
5.04     return;
5.05   }
```

FIG. 8

EXAMPLE 1 – EXTRACT FOR TASK $T_1$ (1/2)

```
0.01   main                    // This is to be packaged as f₀₁₁
0.02   {
0.03      float a, b, x, y;    // variable c has been deleted
0.04      int i, j;

0.05      get_input(i, j);
0.06      if (i == -1) then {
0.09      }

0.10      else if (i > j) then {
0.11         get(a, b);
0.12         func1(a, b);
0.13         put_output(i, j, a, b);
0.14      }

0.21      x = func3(b);
0.22      y = func4(b, 3);
0.23      put_output(x, y);
0.24   }

1.01   void func1(float u, float v)   // This is f₁₁₁
1.02   {
1.03      if (u > v) then u = v;
1.05      return;
1.06   }

3.01   float func3(float s)    // This is f₃₁₁
3.02   {
3.03      s1:
3.04      if (s*s < 20) then {
3.05         s++;
3.06         goto s1;
3.07      }
```

FIG. 9

EXAMPLE 1 – EXTRACT FOR TASK $T_1$ (2/2)

```
3.08   if (s > 0) then return sqrt(s);
3.10 }

4.01  float func4(float t, int n)   // This is f₄₁₁

4.02  {
4.03    int j = (int)t - n;
4.09    return (float)j;
4.10  }
```

FIG. 10

EXAMPLE 1 – RENAMING OF FUNCTIONS (1/2)

```
0.01    void func0_1()           // main() is packaged as func0_1()
0.02    {
0.03       float a, b, x, y;     // variable c has been deleted
0.04       int i, j;

0.05       get_input(i, j);
0.06       if (i == -1) then {
0.09       }

0.10       else if (i > j) then {
0.11          get(a, b);
0.12          func1_1(a, b);
0.13          put_output(i, j, a, b);
0.14       }

0.21       x = func3_1(b);
0.22       y = func4_1(b, 3);
0.23       put_output(x, y);
0.24    }

1.01    void func1_1(float u, float v)    // This is f₁₁₁
1.02    {
1.03       if (u > v) then u = v;
1.05       return;
1.06    }

3.01    float func3_1(float s)    // This is f₃₁₁
3.02    {
3.03       s1:
3.04       if (s*s < 20) then {
3.05          s++;
3.06          goto s1;
3.07       }
```

FIG. 11

EXAMPLE 1 – RENAMING OF FUNCTIONS (2/2)

```
3.08    if (s > 0) then return sqrt(s);
3.10  }

4.01  float func4_1(float t, int n)    // This is f_{411}

4.02  {
4.03    int j = (int)t - n;
4.09    return (float)j;
4.10  }
```

FIG. 12

EXAMPLE 1 – EXTRACT FOR TASK $T_2$ (1/2)

```
0.01    void func0_2()           // main() is packaged as func0_2()
0.02    {
0.03      float b, c, x, y;      // variable a has been deleted
0.04      int i, j;

0.05      get_input(i, j);
0.06      if (i == -1) then {
0.09      }

0.15      else if (i < j) then {
0.16        get_input(b, c);
0.17        func2_2(b, c);
0.18        put_output(i, j, b, c);
0.19      }

0.21      x = func3_2(b);
0.22      y = func4_2(b, 3);
0.23      put_output(x, y);
0.24    }

2.01    void func2_2(float v, float w)    // This is $f_{221}$ and $f_{222}$
2.02    {
2.03      v = v + w + 4.0;
2.04      v = sin(v) + sin(w);
2.05      return;
2.06    }

3.01    float func3_2(float s)    // This is $f_{321}$ and $f_{322}$
3.02    {
3.03      s1:
3.04      if (s*s < 20) then {
3.05        s++;
3.06        goto s1;
```

FIG. 13

EXAMPLE 1 – EXTRACT FOR TASK T$_2$ (2/2)

```
3.07      }

3.08      if (s > 0) then return sqrt(s);
3.10   }

4.01   float func4_2(float t, int n)      // This is f₄₂₁ and f₄₂₂
4.02   {
4.03      int j = (int)t - n;
4.09      return (float)j;
4.10   }
```

FIG. 14

EXAMPLE 1 – EXTRACT FOR TASK $T_3$ (1/1)

```
0.01   void func0_3()           // main() is packaged as func0_3()
0.02   {
0.04     int i, j;

0.05     get_input(i, j);
0.06     if (i == -1) then {
0.07       func5_3();
0.08       end;
0.09     }
0.24   }

5.01   void func5_3(void)        // This is f₅₃₁
5.02   {
5.03     put_output("All calculations are over");
5.04     return;
5.05   }
```

FIG. 15

EXAMPLE 1 – RESTRUCTED PROGRAM (1/4)

```
main()
{
  int task_id;

get_input(task_id);
  if (task_id == 1) then func0_1();
  else if (task_id == 2) then func0_2();
  else if (task-id == 3) then func0_3();
  else Out_err_msg();
  end;
}

0.01   void func0_1()
0.02   {
0.03      float a, b, x, y;
0.04      int i, j;

0.05      get_input(i, j);
          // [Option: Put input checking code here.]
0.06      if (i == -1) then {
0.09      }

0.10      else if (i > j) then {
0.11         get(a, b);
             // [Option: Put input checking code here.]
0.12         func1_1(a, b);
0.13         put_output(i, j, a, b);
0.14      }

0.21      x = func3_1(b);
0.22      y = func4_1(b, 3);
0.23      put_output(x, y);
          return;
```

FIG. 16

EXAMPLE 1 – RESTRUCTED PROGRAM (2/4)

```
0.24   }

0.01   void func0_2()
0.02   {
0.03     float b, c, x, y;
0.04     int i, j;

0.05     get_input(i, j);
         // [Option: Put input checking code here.]
0.06     if (i == -1) then {
0.09     }

0.15     else if (i < j) then {
0.16       get_input(b, c);
           // [Option: Put input checking code here.]
0.17       func2(b, c);
0.18       put_output(i, j, b, c);
0.19     }

0.21     x = func3_1(b);
0.22     y = func4_1(b, 3);
0.23     put_output(x, y);
         return;
0.24   }

0.01   void func0_3()
0.02   {
0.04     int i, j;

0.05     get_input(i, j);
         // [Option: Put input checking code here.]
0.06     if (i == -1) then {
```

FIG. 17

EXAMPLE 1 – RESTRUCTED PROGRAM (3/4)

```
0.07        func5();
0.08        end;
0.09      }
          return;
0.24   }

1.01   void func1_1(float u, float v)
1.02   {
1.03     if (u > v) then u = v;
1.05     return;
1.06   }

2.01   void func2(float v, float w)
2.02   {
2.03     v = v + w + 4.0;
2.04     v = sin(v) + sin(w);
2.05     return;
2.06   }

3.01   float func3_1(float s)
3.02   {
3.03     s1:
3.04     if (s*s < 20) then {
3.05        s++;
3.06        goto s1;
3.07     }

3.08     if (s > 0) then return sqrt(s);
3.10   }

4.01   float func4_1(float t, int n)
4.02   {
4.03     int j = (int)t - n;
```

FIG. 18

EXAMPLE 1 – RESTRUCTED PROGRAM (4/4)

```
4.09     return (float)j;
4.10   }

5.01   void func5(void)
5.02   {
5.03     put_output("All calculations are over");
5.04     return;
5.05   }
```

FIG. 19

EXAMPLE 2 – THREE VERSIONS OF FUNC() (1/2)

```
9.01   void func()
9.02   {
9.03     float a, b, x, y;
9.04     int i, j;

9.05     get_input(i, j);
9.06     if (i == -1) then {
9.09     }

9.10     else if (i > j) then {
9.11       get(a, b);
9.12       func1(a, b);
9.13       put_output(i, j, a, b);
9.14     }

9.21     x = func3(b);
9.22     y = func4(b, 3);
9.23     put_output(x, y);
9.24     return;
9.25   }

9.01   void func()
9.02   {
9.03     float b, c, x, y;
9.04     int i, j;

9.05     get_input(i, j);
9.06     if (i == -1) then {
9.09     }

9.15     else if (i < j) then {
9.16       get_input(b, c);
```

FIG. 20

EXAMPLE 2 – THREE VERSIONS OF FUNC() (2/2)

```
9.17      func2(b, c);
9.18      put_output(i, j, b, c);
9.19    }

9.21    x = func3(b);
9.22    y = func4(b, 3);
9.23    put_output(x, y);
9.24    return;
9.25  }

9.01  void func()
9.02  {
9.04    int i, j;

9.05    get_input(i, j);
9.06    if (i == -1) then {
9.07       func5();
9.08       end;
9.09    }
9.24    return;
9.25  }
```

FIG. 21

EXAMPLE 2 – MERGED AND SORTED VERSION OF FUNC() (1/2)

```
9.01   void func()

9.02   {
9.02   {
9.02   {

9.03     float a, b, x, y;
9.03     float b, c, x, y;

9.04     int i, j;
9.04     int i, j;
9.04     int i, j;

9.05     get_input(i, j);
9.05     get_input(i, j);
9.05     get_input(i, j);

9.06     if (i == -1) then {
9.06     if (i == -1) then {
9.06     if (i == -1) then {

9.07       func5();
9.08       end;

9.09     }
9.09     }
9.09     }

9.10     else if (i > j) then {
9.11       get(a, b);
9.12       func1(a, b);
9.13       put_output(i, j, a, b);
9.14     }
```

FIG. 22

EXAMPLE 2 – MERGED AND SORTED VERSIONS OF FUNC() (2/2)

```
9.15    else if (i < j) then {
9.16       get_input(b, c);
9.17       func2(b, c);
9.18       put_output(i, j, b, c);
9.19    }

9.21    x = func3(b);
9.21    x = func3(b);

9.22    y = func4(b, 3);
9.22    y = func4(b, 3);

9.23    put_output(x, y);
9.23    put_output(x, y);

9.24    return;
9.24    return;
9.24    return;

EXAMPLE 2 – REVISED LISTING (1/1)

```
9.01   void func()
9.02   {

9.03      float a, b, c, x, y;
9.04      int i, j;

9.05      get_input(i, j);
9.06      if (i == -1) then {
9.07         func5();
9.08         end;
9.09      }

9.10      else if (i > j) then {
9.11         get(a, b);
9.12         func1(a, b);
9.13         put_output(i, j, a, b);
9.14      }

9.15      else if (i < j) then {
9.16         get_input(b, c);
9.17         func2(b, c);
9.18         put_output(i, j, b, c);
9.19      }

9.21      x = func3(b);
9.22      y = func4(b, 3);
9.23      put_output(x, y);

9.24      return;
9.25   }
```

FIG. 24

RESTRUCTURING COMPUTER PROGRAMS

FIELD OF THE INVENTION

The present invention relates to the restructuring of computer programs, to assist in improving the ability to understand, port, and maintain the code of such computer programs.

BACKGROUND

Many early computer programs were written in a relatively haphazard manner. As a result, many of these programs can be very difficult to understand due to the complexity and lack of structure of the underlying code, which is often referred to as "spaghetti code" due to this unstructured complexity.

Such unstructured computer programs rarely have any reliable explanatory documentation. Further, the original developers of these computer programs are typically no longer available for consultation. Understandably, the maintenance, modification, and porting of such computer programs is, as a result, particularly difficult.

Over the years, a huge investment has been made in such computer programs that are often used in critical operations or applications, often referred to in this context as "legacy applications". These legacy applications have earned the trust and confidence of their users for the simple reason that they operate as expected.

The owners of legacy computer applications increasingly wish to port their applications to new computing environments, especially if existing computing environments are no longer supported at the hardware or operating system level. The transition of such applications to new computing environments is usually preferred, compared to other possible options, such as rewriting the relevant application. However, there is often little if any adequate supporting documentation that might assist in making this transition. Consequently, the task of porting the legacy application to a new platform can be an unpredictable and expensive undertaking when manually performed.

Accordingly, a need clearly exists for an improved manner of restructuring computer programs that at least attempts to address one or more existing limitations of the prior art.

SUMMARY

An existing computer program is restructured to a new computer program such that the new computer program performs all (or a desired subset) of the tasks performed by the existing computer program.

Experienced users of the existing program assist with the identification and selection of tasks to be performed by the restructured program, and, for each task, the generation of a reliable and comprehensive set of test cases used to verify the correct functioning of the restructured program. Such experienced users, due to their long familiarity and use of the existing program, can provide detailed information about: (i) the tasks for which the original computer program is used, (ii) the inputs (including their valid ranges) related to each of the tasks required to be performed by the program, (iii) the outputs generated by the program, and (iv) known but unfixed bugs. The test cases are also used to restructure the existing program.

Particular advantages that accrue from restructuring computer programs include easier maintenance of the restructured program compared to the original computer program.

The described techniques are particularly useful for maintaining legacy codes or applications for which reliable documentation is either not available or inadequate. The restructured program can be more readily used than the original program as a baseline against which further enhancements can be added to the program. Such further enhancements may include, for example, introduction of fresh code for new tasks to be performed by the restructured program.

DESCRIPTION OF DRAWINGS

FIGS. 3 to 19 provide computer code of a first described example relating to restructuring of computer code, while FIGS. 20 to 24 provide code of a second described example relating to restructuring of computer code.

FIGS. 3 to 5 provide computer code for a full program for the first example.

FIGS. 6 to 8 provide computer code corresponding with that of FIGS. 3 to 5, when recast in canonical form.

FIGS. 9 and 10 provide computer code extracted from the canonical form of code provided in FIGS. 6 to 8, for performing a task $T_1$.

FIGS. 11 and 12 reproduce the computer code from FIGS. 9 and 10 with the functions, including main ( ), renamed.

FIGS. 13 and 14 provide computer code extracted from the canonical form of code provided in FIGS. 6 to 8, for performing a task $T_2$. The functions in the extracted code are renamed.

FIG. 15 provides computer code extracted from the canonical form of code provided in FIGS. 6 to 8, for performing a task $T_3$. The functions in the extracted code are renamed.

FIGS. 16 to 19 provide computer code corresponding with that of FIGS. 3 to 5, in which the whole computer code is restructured.

FIGS. 20 and 21 provide computer code of a second described example, in which there are three separate versions of the func ( ) function.

FIGS. 22 and 23 provide computer code corresponding with that of FIGS. 20 and 21, in which the different versions of func ( ) function are merged and sorted.

FIG. 24 provides computer code corresponding with that of FIGS. 20 and 21, in which there is a revised listing of the func ( ) function.

DETAILED DESCRIPTION

Figure 1:
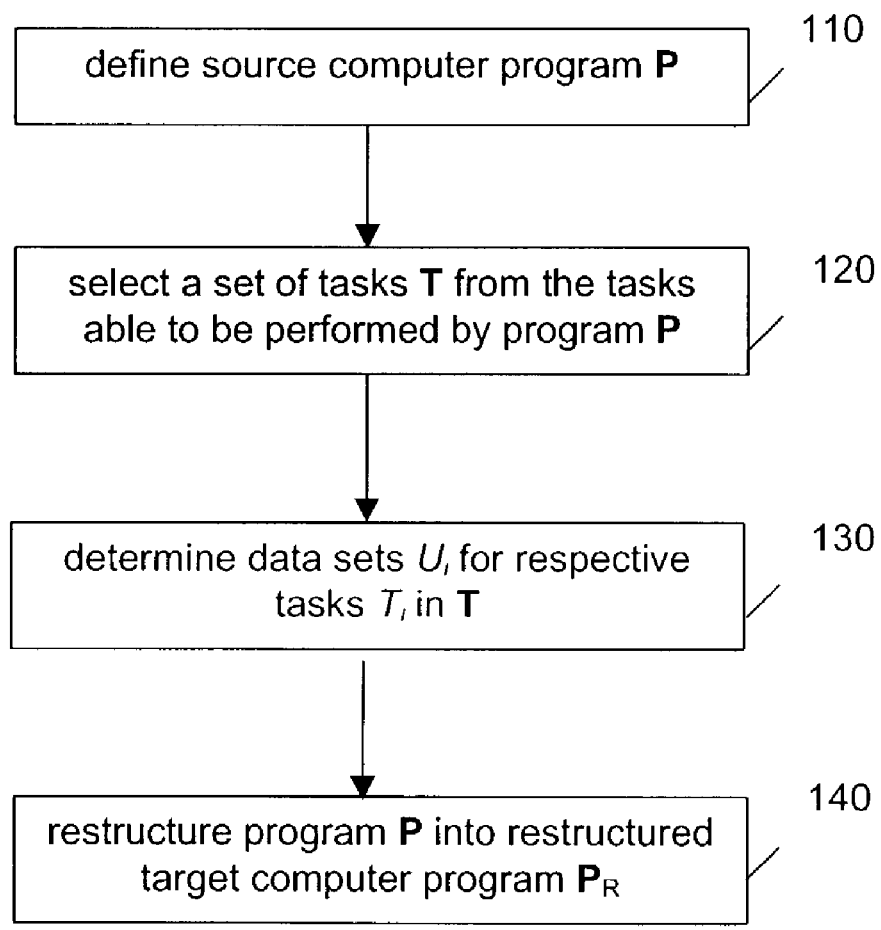
FIG. 1 is a flowchart of the steps involved in a technique for restructuring a computer program.

Techniques for restructuring computer programs are described herein. A computer system, and computer software for use in performing these techniques are also described herein.

Terminology

Various terms are used herein, explanatory definitions for which are given below.

Program: A computer program comprises a main function definition. The computer program can further comprise one or more other function definitions. The main function definition, and any other function definitions, can appear in any order. The distinction between the main function, and any other functions, is that when a computer program is first invoked for execution, the program executes with the first executable statement in the main function definition. That is, the computing environment calls the main function to execute the program. The main function returns a value to the environment in which the program executes.

Function: A function is also known as a subroutine, subprogram, procedure in the literature. A function is characterized by a name, a list of parameters, a sequence of actions, and a datatype of the return value of the function.

Function definition: A function definition encodes the characteristics of a function in a suitable format, such as:

```
Return-datatype function-name (parameter declaration,
if any)
{
    declarations and statements
}
```

The term parameter is generally used for a variable named in the parenthesized list in a function definition, while the term argument is generally used for the value of the parameter used in a call of the function. The declarations and statements within the curly brackets are also known as the function body. These declarations and statements encode a sequence of actions performed by the function, as well as any supporting declarations.

```
float f(float b, float c)         // This line is the
{                                 // function's declaration.
    float g, h;
    g = b + 2*c;                  // Contents within curly
    h = c;                        // brackets form the
    return g*h + 1;               // function's body.
}
```

The example function's declaration can be interpreted as describing a function whose name is f and whose parameters are b of data type float and c of data type float. The function float f (float b, float c) returns a value whose data type is float. The statements constituting the function's body carry out actions necessary to compute the return value.

Problem Definition

Consider a program P (that is, the legacy application, for example) that comprises a main function definition $F_0$. The program P optionally comprises one or more other function definitions $F_1, F_2, \ldots F_r$. Thus the program represents the set $P = \{F_0, F_1, F_2, \ldots Fr_r\}$.

Associated with P is the set of tasks $T = \{T_1, T_2, \ldots T_n\}$. Each task, if appropriate input data is provided, is performed by program P. T is also the set of tasks the restructured version of P is expected to perform in a manner P would have if given identical inputs. P may have additional task performing abilities but they are of no concern in the restructured version.

The restructuring of P results in another program $P_R$ such that $P_R = \{M_R, C_1, C_2, \ldots C_n\}$, where a $C_i$, referred to herein as a component, contains all the required declarations and executable statements extracted from P required to execute the task $T_i$. $M_R$ is a newly created main function for $P_R$ whose principal task is to ascertain which task the user wishes to invoke and ensure the execution of the corresponding component $C_i$ to execute the task.

Typically, component $C_i$ can be viewed as the set of functions $C_i = \{F_{0i}, F_{1i}, F_{2i}, \ldots F_{ri}\}$, where $F_{0i}$ contains all the declarations and executable statements extracted from $F_0$ in the context of executing the task $T_i$ but packaged as a function, and, likewise, each function $F_{ki, k>0}$, contains all the declarations and executable statements extracted from $F_k$. Note that the structure of $P_R$ is such that if a task $T_j$ is modified, or eliminated, only $C_j$ is modified, or eliminated along with its corresponding code in $M_R$, while the rest of $P_R$ remains unchanged.

Although the code size of $P_R$ is usually expected to be larger than that of P, $P_R$ is generally expected to be better understood than P, especially if P is coded in "spaghetti" fashion. Accordingly, $P_R$ can be expected to be better optimizable than P on a task-by-task basis.

Overview

With reference to the above "Problem definition" subsection, an overview of the described restructuring process is described with reference to FIGS. 1 and 2.

FIG. 1 is a flowchart of the steps involved in the restructuring process. In step 110, a source computer program P is defined. In step 120, a set of tasks T from the tasks performed by program P is selected. In step 130, data sets $U_i$ are determined for respective tasks $T_i$ from the set of tasks T. Once steps 110 to 130 are performed, the source program P is restructured into corresponding target computer program $P_R$ in step 140.

Figure 2:
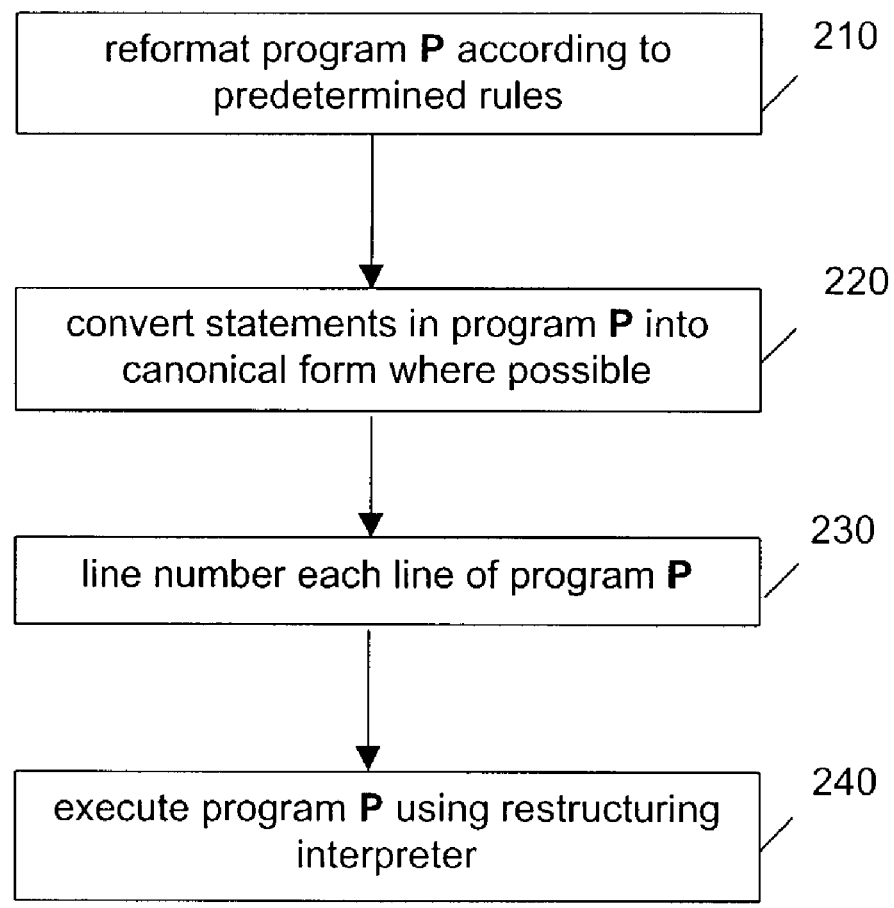
FIG. 2 is a flowchart of the steps involved in preformatting a computer program to be restructured in accordance with FIG. 1.

FIG. 2 is a flowchart of the steps involved in preformatting the source program P prior to restructuring the program as target program $P_R$. In step 210, the source program P is reformatted according to predetermined formatting rules. Then, statements in reformatted source program P are converted to a canonical form in step 220. This canonical form may be predetermined, or selected from one or a number of possible predetermined canonical forms. A particular canonical form may be selected as most appropriate given the existing form of the source program P.

In step 230, a line number is provided for each line of the reformatted and converted source program P. At this stage, the source program P is executed in step 240 using a restructuring interpreter to initiate the restructuring process.

The above overview of the process of restructuring a computer program is described in further detail below.

Restructuring Process

The fundamental assumption for developing the restructuring method is that a properly documented list of tasks can be created, if necessary, by experienced users of program P and that the resulting document may be considered as a requirements document for the program $P_R$.

Once the tasks have been identified, the restructuring process can be performed in three parts.
1. Creation of input data sets for each task in T.
2. Creation of components $C_1, C_2, \ldots C_n$ and $M_R$.
3. Manual optimization of $P_R$.

Creation of Input Data Sets for Each Task in T

A known set of tasks, including the set T, and a source for obtaining (or an ability to create) valid input data sets for desired coverage of the tasks is assumed for program P.

Hence specifying the tasks set T, and for each task in T, creating one or more input data sets to provide complete coverage of the task is expected to be achievable. For example, one may collate input data from past input data files to P for the chosen task.

A group of input data sets $U_i=\{u_{i1}, u_{i2}, \ldots u_{ip}\}$ is available whose individual members may carry out either the complete task $T_i$ or a subtask of $T_i$. Note that, in general, p is not constant but is a function of i; that is, $p=p(i)$. Collectively each group of input data sets provides full coverage for executing task $T_i$. Data boundaries for task $T_i$ are assumed to be known, and these data boundaries are assumed to be accounted for in $U_i$.

Furthermore, assume that no member $u_{ij}$ of $U_i$ creates error conditions when used as input to the program P.

Creation of Components $C_1, C_2, \ldots C_n$ and $M_R$

This part of the described program restructuring technique has 11 steps, as described below.

Step 1—Reformatting Original Code

First, program P is reformatted (if not already in the desired format) according to a predefined set of rules.

For example, these predetermined formatting rules may involve:

(i) arranging function definitions $F_0, F_1, F_2, \ldots F_r$ in an ASCII ascending order of the function's name;
(ii) replacing multiple blanks in statements with a single blank wherever permissible;
(iii) indenting blocks of statements according to their nesting order;
(iv) removing redundant brackets, etc These rules facilitate character string comparisons between any two parts of P. Many modern programming languages (such as C and C++) provide functions for character string operations. For example, these character string operations can include functions for finding a string, comparing two strings, and deleting a string. Such functions can be used to implement the application of predetermined formatting rules to the original code.

Conditional constructs may require careful reformatting in some programming languages. Some programming languages allow for premature termination of a conditional construct, if the evaluation of a subset of the total conditions unambiguously determines the final Boolean result of the conditional construct. Consider the following example:

```
if (j<0&&k<1||k>10) then { ... }
```

A final Boolean result of TRUE is determined, irrespective of the result of evaluating k>10 if j<0 && k<1 is TRUE. Further, in j<0 && k<1 one may conclude that the result is FALSE if j>=0 without determining if k<1. For such constructs, one may, for example, format the statement as follows:

```
if (
    j < 0
    && k < 1
    || k > 10
)
then { . . .}
```

The restructuring interpreter is appropriately programmed to handle statements formatted in this way. The above described formatting of the conditional statement is used to achieve various benefits described herein. These benefits are clear from the following description in relation to: (a) the second and third steps noted below, (b) step 7—merging of variants of a function in $C_i$ or step 8—merging of variants of a function across $C_i$.

The required formatting for a given programming language can be determined as appropriate.

Step 2—Converting to Canonical Forms

Second, statements or blocks of statements are converted into a canonical form wherever possible. That is, if more than one way of expressing statement(s) is available, then only one from the many ways of expression is chosen as the canonical form and all instances of other forms are converted to the canonical form. For example, if a++ and a=a+1, both appear then choose one of them, say, a++ as the canonical form and convert instances of a=a+1 into a++.

Another example is the switch-case statement, a representation of which is given directly below.

```
switch(j) {
    case 1: . . . . . . . . .; break;
    case 2: . . . . . . . . .; break;
    . . . . . . . . . . . . . . . . . . . . . . . . . . . . . . .
    case 6: . . . . . . . . .; break;
    default: break;
}
```

If an alternative if-else construct is chosen as the canonical form then the above example is restructured as follows:

```
if (j == 1) then { . . .};
else if (j == 2) then { . . .};
. . . . . . . . . . . . . . . . . . . . . . . . . . .
else if (j == 6) the { . . .};
else { . . .};
```

A sequence of else-ifs can be arranged in ASCII order of the conditions contained in the if-else construct. Such arrangement is possible if semantic correctness can be maintained in the reordering so that equivalence of condition groups can be caught if they appear in different permutations in different parts of P.

In yet another example, consider a while statement such as:

```
while (i > 0) {
    a++;
    i--;
}
```

This statement can be converted to an if statement:

```
s10: if (i > 0) then {
    a++;
    i--;
    goto s10;
}
```

The use of canonical forms makes equivalent code segments easier to detect especially g automated tools.

Step 3—Line Numbering

Third, each line in the program P is provided with a unique line number, preferably in ascending order. Line numbering facilitates the location of particular code fragments.

The following statement has only one associated line number (in this case, 11), as the statement only appears on one line:

```
11 if (j<0&&k<1||k>10) then a=a*b+1;
```

The equivalent code is given below:

```
32 if ( j < 0
33 && k < 1
34 || k > 10 )
35 then a = a * b + 1;
```

This equivalent code has four associated line numbers (in this case, 32-35), as the code appears over four lines.

Step 4—Program Execution—Use of Flags

The program P is executed by a tool that can be considered to be a restructuring interpreter. After performing steps 1 to 3 described above, the program P is executed for each user input data set in $U_i$, say $U_{ij}$, related to the task $T_i$. The essential difference between a conventional interpreter (or a debugger) and a restructuring interpreter is that the restructuring interpreter flags every statement or part of a statement that the restructuring interpreter executes.

Assignment statements, if executed, are executed completely. By contrast, if statements are sometimes partially executed, as noted above.

When the restructuring interpreter is executing the program P, three kinds of flags are used.
(i) The first flag is placed on a statement (or part of a statement) just before the restructuring interpreter begins execution.
(ii) The second flag replaces the first flag as soon as the execution of the statement (or part of a statement) is completed.
(iii) A third flag is placed on a statement (or part of a statement) if the statement is being executed more than once while executing with input data $u_{ij}$.

A statement (or part of a statement) being reexecuted has two flags—first and third flags just prior to beginning of execution, and second and third flag on completion of execution.

If a program terminates abnormally while executing a statement (or part of a statement), the "maverick" statement can be detected. Detection is possible, as this maverick statement is the only statement that has a first flag that is not tagged to a function call that has not been completed.

All other statements with only a first flag will necessarily be a call to a function. Until the call is completed, the first flag remains. If there are several statements with only a first flag, these statements belong to a sequence of nested function calls, and the maverick statement belongs to the body of the last called function in this sequence of nested call functions.

The main use of the third flag is to draw attention to frequently executed statements that might benefit from manual optimization.

Reformatting of P is essentially a means of making the restructuring interpreter's tasks of flagging easier.

Step 5—Extraction of Code from P for Creating Components $C_i$

After completing execution of program P with input data $u_{ij}$ (a) all unflagged executable statements (or substatements, where appropriate) from program P are deleted, and (b) all declarations redundant to the remaining executable statements in program P are deleted. A version of component $C_i$, referred to as $c_{ij}$, with respect to $u_{ij}$, is thus captured. At this stage each $c_{ij}$ comprises two parts:
(i) declarations and statements that were extracted from $F_0$ of P and which are to be packaged as a normal function rather than as a main function into $f_{0ij}$, and
(ii) $f_{1ij}, f_{2ij}, \ldots f_{rij}$ comprising declarations and statements extracted from $F_1, F_2, \ldots F_r$, respectively.

In general, $c_{ij} = \{f_{0ij}, f_{1ij}, f_{2ij}, \ldots f_{rij}\}$. However, if a function, for example, $F_k$ is not called while executing P with input data $u_{ij}$, then $f_{kij}$ is absent from $c_{ij}$.

In essence, $c_{ij}$ is a complete program with $f_{0ij}$ as its defacto main function. The code $c_{ij}$ is a complete program for all such data for which $u_{ij}$ is a representative example. Thus, one may view $c_{ij}$ as a program that runs a subtask of $T_i$. Note that $c_{ij}$ necessarily exists as $u_{ij}$ is a data set chosen such that P is executed.

$C_i$ can be constructed from the assembled $c_{ij}$, j=1, 2, ... p(i). Steps 6 to 8 show how this can be done efficiently by retaining, in the assembled $c_{ij}$, only one copy of a function definition appearing more than once and by merging different variations of a function definition into a single function definition.

Step 6—Retaining One Copy from Multiple Copies of a Function Definition

This step is described by the following pseudo-code fragment.

```
// Pseudo-code fragment
do k = 1, 2, ... p(i) - 1 {
    if C_ik is not found, continue
    do l = k+1, k+2, ... p(i) {
        if c_il is not found, continue
        String compare c_ik and c_il.
        if c_ik = c_il then delete c_il and continue.
        do m = 0, 1, 2, ... r {
            if f_mil or f_mik is not found, continue
            String compare f_mik and f_mil.
            if f_mik = f_mil then delete f_mil.
        }
    }
}
```

Note that string comparisons can be made to determine if $c_{ik} = C_{il}$ or $f_{mik} = f_{mil}$ if each entity is formatted to a canonical form.

No two function definitions are now identical in $C_i$, because as may be seen from the above pseudocode, all but one copy of a function definition is retained, and other copies, if any, are deleted. However, two or more function definitions with the same function declaration but different body contents may exist. A means of merging a group of function definitions with the same function declaration into a single function definition is described directly below.

Step 7—Merging Variants of a Function in $C_i$

Let two functions $f_{mik}$ and $f_{mil}$ from $C_i$ be two functions that share the same function declaration (that is, of $F_m$) but whose body contents are different. Since the lines in P are already numbered, the merging of the bodies of the functions $f_{mik}$ and $f_{mil}$ is fairly easy. To proceed, choose one of the functions, for example, $f_{mik}$ as the anchor and append to its body the body of $f_{mil}$. If there are more than two functions with the same function declaration in $C_i$ then the bodies of each of the remaining functions are also appended one by one to the body of $f_{mik}$. After the appending operation, sort the augmented body off $f_{mik}$ by line number in ascending order (assuming that the line numbering in P is in ascending order). After the sorting operation, if a line number appears more than once, then for each group of lines carrying the same line number, do the following:

(i) if all such lines are declarations (recall that while creating $c_{ij}$, all declarations redundant to $c_{ij}$ were also deleted), consolidate their contents into a single declaration by eliminating any duplication of information, if any; else (ii) if all such lines have identical text, then delete all such lines except one; else (iii) if all such lines are conditional statements, delete them all and in their place put a copy of the corresponding conditional statement from P. In the copy, delete all conditions which have variables that have become undeclared due to step (i).

In addition, if a group of lines in $f_{mik}$ are identified as belonging even partially to a corresponding conditional construct in P, then:

(v) delete the said group of lines from $f_{mik}$ and in its place copy the corresponding conditional construct from P. In the copy, delete all conditions that have variables that have become undeclared due to step (i).

After the merging operation is completed, retain only $f_{mik}$ and delete all other function definitions involved in the merger.

In each $C_i$, now rename all functions, for example, by tagging all function names with the task's ID, and make corresponding changes to all calls to those functions. For example, one may rename $f_{mik}$ as funcm_i, where funcm is assumed to be the original name of $f_{mik}$. All calls to funcm in $C_i$ are now made to funcm_i.

This renaming process clearly separates different $C_i$s from each other, as there are no function name clashes among the various tasks. Separating tasks in this manner allows task-related modifications to be done without interfering with code for other tasks. The renaming process also applies to the "main" function $f_{Oik}$ of $C_i$. All the other main functions $f_{Oil}$ of $C_i$ merge to the "main" function $f_{Oik}$ of $C_i$ if $f_{Oik}$, which is always there for all permissible values of k (that is, k=1, 2, . . . r), is chosen as the anchor.

Step 8—Merging Variants of a Function Across $C_i$

The size of $P_R$ may be quite large even after the merging of variants of a function in $C_i$. The relatively large size of $P_R$ is attributable to each $C_i$ carrying a variant $f_{k\_i}$ of $F_k$, k=1, 2, . . . r. Furthermore, for ease of understanding, the number of new function names is desirably reduced, if possible. Thus, as many of the $f_{k\_i}$, i=1, 2, . . . n as possible are merged, and revert to original function names wherever possible, within $P_R$. Variants of $F_O$ are excluded to maintain task identity. To accomplish a possible reduction in function names, the following steps are performed for k>0:

1. If there is at least one $f_{k\_i}$ whose contents are identical to those of $F_k$, then delete all $f_{k\_i}$, i=1, 2, . . . n that exist. Copy $F_k$ into $P_R$ and change all calls to $f_{k\_i}$ in their respective $C_i$ to calls to $F_k$.

2. If two functions $f_{k\_r}$ and $f_{k\_s}$ have identical contents but not identical to those of $F_k$, delete one of them, say, $f_{k\_s}$, from $P_R$ and all calls to $f_{k\_s}$ are then changed to calls to $f_{k\_r}$. Alternatively, if only one variation of $F_k$ exists, say, $f_{k\_r}$ whose contents are not identical to those of $F_k$, then retain $f_{k\_r}$.

3. For all left over $f_{k\_i}$ do the following:

Take all variations of $F_k$, that is, functions $f_{k\_i}$=1, 2, . . . , n which exist, and append their bodies into a single function and refer to this single function as $f_{k\_R}$. Following the append operation, sort the body of $f_{k\_R}$ by line number in ascending order (this sorting process assumes that the line numbering in P is in ascending order). After the ordering is completed, if a line number appears more than once, then for each group of lines carrying the same line number, do the following:

(i) if all such lines are declarations, consolidate their contents into a single declaration by eliminating any duplication of information, if any; else (ii) if all such lines have identical text, then delete all such lines except one; else (iii) if all such lines are conditional statements, delete them all and in their place put a copy of the corresponding conditional statement from P. In the copy, delete all conditions that have variables that have become undeclared following step (i).

In addition, if a group of lines in $f_{k\_R}$ are identified as belonging even partially to a corresponding conditional construct in P, then (iv) delete the said group of lines from $f_{k\_R}$ and, in its place, copy the corresponding conditional construct from P. In the copy, delete all conditions that have variables that have become undeclared due to step (i).

Delete all $f_{k\_i}$, i=1, 2, . . . , n. Copy $f_{k\_R}$ into $P_R$ and change all calls to any of the $f_{k\_i}$ in $P_R$ to calls to $f_{k\_R}$. Note that the functions $f_{k\_R}$ will now be shared by all the $C_i$ in $P_R$.

Step 9—Handling if-then-else Conditions

Conditional statements are assumed to appear only in if-then-else canonical form. When such statements are executed, a syntactical convention is adopted in accordance with the example given below.

A general if-then-else condition appears as follows:

if ( . . . ) then { . . . } else { . . . }

When executing a data set, if the then clause is executed then the extracted code appears as:

if ( . . . ) then { . . . } else { }

This may be simplified to:

if ( . . . ) then { . . . }

This code can be further simplified in some cases to { . . . }. However, this simplification has not been done in this case since some programming languages permit assignment statements inside an if construct.

Furthermore, retaining if ( . . . ) helps in the understanding of the restructured code since one is able to see the conditions that were actually invoked prior to the execution of:

{ . . . }.

Conversely, if the else clause is executed, the extracted code appears as:

if ( . . . ) then { } else { . . . }

The restructuring interpreter flags those conditions inside ( . . . ) that were tested, and those statements in { . . . } that were actually executed.

A particularly interesting situation occurs in the switch-case statement when only the default condition is executed. In this case, the entire switch-case statement can be replaced by the statements encapsulated with the default condition. For example, in:

```
switch(j) {
    case 1: .........; break;
    case 2: .........; break;
    ........................
    case 6: .........; break;
    default: <default-statements>;
}
``` if only the default case is executed, then the above can be simply replaced by:

```
<default-statements>;
```

The if-then-else version of the above switch-case example is:

```
if (j == 1) then {...};
else if (j == 2) then {...};
........................
else if (j == 6) then {...};
else {<default-statements>};
```

Execution of the default case results in:

```
if (j == 1) then {};
else if (j == 2) then {};
... ... ... ... ... ... ...
else if (j == 6) then {};
else {<default-statements>};
```

From this code, the code can be clearly further reduced to:

```
<default-statements>;
```

In any event, <default-statements> may of course be empty. As a precaution, one may choose to retain all blank then { } and else { } conditions instead of eliminating these conditions when the opportunity exists. Such precaution may be useful, for example, if there are doubts that the coverage provided by the set of tasks T is not complete, or that P has some unresolved bugs. In such cases the blank { } may be populated with a suitable error message that is activated if an attempt is made by the program to branch to a blank condition.

Step 10—Introduction of Error Handlers for Input Data

Whenever necessary, additional code is manually introduced to check all input values provided through input statements for validity and, on error, transmit error messages or call error handlers (that may also have to be manually written). The restructuring interpreter leaves a highlighted message as a reminder to the programmer. This reminder, placed immediately after an input statement, reminds the programmer that input checking and error handling code is desirable in place of the highlighted message.

Step 11—Construction of the Main Function $M_R$

The main function $M_R$ for $P_R$ can be created manually (although automating these tasks is also possible). Manually creating $M_R$ for $P_R$ is relatively simple. First, create the declarations (of variables lists, etc.). Second, create one or more conditional statements such that when input data for task $T_i$ is encountered, $C_i$ is executed.

The following code fragment illustrates how this process can be performed and used as a template for creating $M_R$. There are 3 tasks and each task is given a unique ID, for example, 1, 2, 3. Task with ID=1 calls function f01 ( ), task with ID=2 calls function f02 ( ), and task with ID=3 calls function f03 ( ). Any other task ID results in an error condition.

```
main( )
{
    int_task_id;
    get_input (task_id);
    if (task_id == 1) then f01( );
    else if (task_id == 2) then f02( );
    else if (task-id == 3) then f03( );
    else Out_err_msg( );
    end;
}
```

Manual Optimization of $P_R$

State-of-the-art optimizing compilers cannot match the optimizing abilities of expert programmers. As (i) a component $C_i$ is usually smaller than the original program P and (ii) the component $C_i$ will be more focussed towards a task rather than a group of tasks, the component $C_i$ is comparatively easier to understand, debug, optimize, and enhance compared to the original program P. Thus individual tasks may be made to run faster in $P_R$ than in P.

In manual optimization, one can frequently take advantage of the statistical fact that for large codes with many function definitions, substantial amounts of execution time is usually spent in less than 10% of the total number of functions in a program. Thus, even in a large program, the amount of code required to be optimized from a practical standpoint is usually manageable.

The functions requiring optimization can be detected by using a profiling tool with which many modern compilers are equipped with or by appropriately "instrumenting" the program $P_R$ for profiling. For some legacy codes, some form of software instrumentation may be necessary. Software instrumentation can be introduced using additional code in each function (including the main function) that detects the time the function was entered, and the time when the function was exited. A running sum of the time spent in each of the functions (that is, the difference between exit and entry times) is maintained for every respective function call, to establish a pattern of function use.

As an optional feature, for a given $u_{ij}$, one may highlight in P the declarations and statements that constitute $c_{ij}$. Highlighting declarations and statements helps obtain an intuitive feel for how code segments in P relate to various functionalities that are distributed and mapped in P. The restructuring interpreter collates all necessary code segments in one place for subsequent manual modification.

Designing Input Data Sets

If an input data set is designed to explore a simple task, one would usually expect only a small part of the code P to execute. Thus the resulting size of the corresponding implemented code usually enables one to better understand this restructured code, optimize the code with reasonable effort, and perhaps modify the code to make the code reusable.

Some time is preferably spent exploring the program P through a series of input data sets that are devised to test very simple tasks. Then a combination of simple tasks are devised, and so on until one begins to intuitively feel how the program P operates, note redundancies in the program's coding etc. In some cases, particular coding redundancies may have been deliberately introduced in the original code to speed up execution in some specific computing environment.

By using variations of an input data set, one can compare the differences between the original program's respective executed code segments, and learn how one can favorably consolidate these code segments. By suitably changing the input parameter values over their permissible ranges in a series of runs, and comparing the resulting series of executed code segments with each other, one can extract fully restructured code for the task being studied. This process is necessary if the task produces executed code segments that contain conditional statements.

In fact, the above strategy can be usefully applied to even modern codes that require restructuring or that include errors. Input data sets devised to test suspected functionalities produce an actual list of statements that are executed. This list can be examined for correctness.

Debugging executed code segments is relatively simple compared to debugging all of P, because the smaller executed code segments can be converted into an executable program, with little programming effort.

Improving Code Delivery to Customer

Most software projects fall far behind schedule. In such situations, clients are sometimes agreeable to receiving a partial product provided that whatever functionalities are provided are robust enough to carry out a subset of the tasks required of the final product P.

The described code restructuring method can be used to make such partial deliveries of P. Such partial deliveries can be made by selecting a subset of the tasks after consulting the customer, and creating a $P_R$ for those tasks from P. Subsequently, code for each additional task can be added to $P_R$, one task at a time, by extraction from P.

Some features of the described method are now illustrated through the following two examples.

EXAMPLE 1

FIGS. 3 to 5 provide computer code relating to a first example. In the first example, the program P has a main function main( ), and 5 functions func1 ( ), func2 ( ), func3 ( ), func4 ( ), func5 ( ). The line numbering in P is used to readily identify particular code segments. The digit to the left of the dot identifies the function: 0 for the main function, and 1 to 5, respectively, for the functions func1 ( ) to func5 ( ). The number to the right of the dot represents the sequential line number in a function.

The functions get_input ( ), put_output ( ), and sin ( ) are assumed to be built-in functions. The canonical form chosen for conditional statements is the if-then-else construct. Further, in the C-like language on which the examples described herein are based, the function arguments are assumed to be passed by address and not by value.

The program P is recast into canonical form by converting the while construct in func3 ( ), and the switch-case construct in func4 ( ) in the computer code of FIGS. 6 to 8.

Once the set of tasks $T=\{T_1, T_2, \ldots T_n\}$ is finalized, a hierarchical design of $P_R$ can be formed in which the only functions $M_R$ calls are the functions $f_{0i}$, i=1, 2, ... n. For illustration, consider the data sets for tasks $T=\{T_1, T_2, T_3\}$ as given below:

For $T_1$, the data set $U_1=\{u_{11}\}$ is
$u_{11}=\{i, j, a, b\}=\{10, 5, 2, 0\}$
For $T_2$, the data set $U_2=\{u_{21}, u_{22}\}$ is
$u_{21}=\{i, j, b, c\}=\{5, 10, 2, 0\}$
$u_{22}=\{i, j, b, c\}=\{5, 10, 2, 2\}$
For $T_3$, the data set $U_3=\{u_{31}\}$ is
$u_{31}]=\{i, j\}=\{-1, 5\}$ Task $T_1$ For the test data $u_{11}=\{i, j, a, b\}=\{10, 5, 2, 0\}$, the extraction of code procedure provides $c_{11}$ as given in FIGS. 9 and 10.

Since there is only one test case:

$$C_1=c_{11}=\{f_{011},f_{111},f_{311},f_{411}\}=\{\text{func0\_1,func1\_1, func3\_1,func4\_1}\}$$

Thus the merging of variants of a function is bypassed and the functions renamed as follows: "main" function $f_{011}$ to func0\_1, and of the remaining functions $f_{111}$ to func1\_1, $f_{311}$ to func3\_1, $f_{411}$ to func4\_1, so that $C_1$ is as given in FIGS. 11 and 12.

Task $T_2$

For the test data $u_{21}=\{i, j, b, c\}=\{5, 10, 2, 0\}$ and $u_{22}=\{i, j, b, c\}=\{5, 10, 2, 2\}$, the extracted codes $c_{21}$ and $c_{22}$ are found to be identical. One of these extracted codes, for example, $c_{22}$ can be deleted. In this respect, refer to the subsection entitled "Creation of components $C_1, C_2, \ldots C_n$ and $M_R$, step 6". On the other extracted code $c_{21}$, functions appearing therein are renamed and its "main" function converted to $f_{021}$=func0\_2 so that $C_2=c_{21}\{f_{021}, f_{221}, f_{321}, f_{421}\}=\{$func0\_2, func2\_2, func3\_2, func4\_2$\}$ is as given in FIGS. 13 and 14.

Task $T_3$

Since, there is only one test data $u_{31}=\{i, j\}=\{-1, 5\}$ and the extracted code is rather small, one can easily see that $C_3=c_{31}=\{f_{031}, f_{531}\}=\{$func0\_3, func5\_3$\}$ is as given in FIG. 15.

Now that $C_1$, $C_2$, and $C_3$ are available, merging of variants of different functions across $C_i$, as described above in the subsection entitled "Merging variants of a function across $C_i$" is attempted.

Functions that fulfill the conditions of step 1 in the subsection entitled "Step 8—Merging variants of a function across $C_i$" are described as follows. Only one variant of func2 ( ) exists as func2\_2 ( ) in $C_2$ and the contents of func2\_2 ( ) are identical to those of func2 ( ). Thus the conditions of step 1 are fulfilled. Hence func2\_2 ( ) is removed from $C_2$ and a copy of func2 ( ) is placed in $P_R$. Furthermore, all calls to func2\_2 ( ) in $C_2$ are changed to calls to func2 ( ). Similar action is taken on func5\_3 ( ).

Functions that fulfill the conditions of step 2 in the subsection entitled "Step 8—Merging variants of a function across $C_i$" are described as follows. Two variants of func3 ( ) exists as func3\_1 ( ) and func3\_2 ( ) in $C_1$ and $C_2$, respectively, and the contents of func3\_1 ( ) and func3\_2 ( ) are identical but different from the contents of func3 ( ). Thus the conditions of step 2 are fulfilled. Hence one of the variants, for example, func3\_2 ( ) is removed from $C_2$ and all calls to func3\_2 ( ) in $C_2$ are changed to calls to func3\_1 ( ). Similarly changes are performed on functions func4\_1 ( ) and func4\_2 ( ) (for example, delete func4\_2 ( ) and change all calls to func4\_2 ( ) in $C_2$ to calls to func4_1 ( )). For func1_1 ( ), the alternative condition of step 2 applies. Hence, func1_1 ( ) is retained.

Next, each version of main ( ) is packaged as an ordinary function. This is usually straightforward in most programming languages and requires placing a return statement as the last executable statement in each version of main. In the C programming language, even placing a return statement may not be required, if the function's return type is explicitly stated as void. However, if a version of main has more than one exit point, appropriate return statements must be placed at each of those exit points.

The restructured program is given in FIGS. 16 to 19.

In this version, the following comment: "[Option: Put input checking code here.]" is placed after input statements to indicate that inserting code to check the inputs before proceeding further with the execution of $P_R$ is generally advisable.

EXAMPLE 2

In this example, some aspects of how multiple versions of a function may be merged into one are demonstrated. Consider the three versions of the function func ( ) given in FIGS. 20 and 21.

When the bodies of the three functions are appended to one of them and sorted in ascending order of line numbers, the code given in FIGS. 22 and 23 is obtained.

Now, since lines 9.02, 9.04, 9.05, 9.06, 9.09, 9.21 to 9.25 each appear as multiple identical copies, all but one copy of each of these lines is deleted. Then, since line 9.03 has two copies of a declaration statement, the variables list (which now becomes a, b, c, x, y) is consolidated. Finally, lines 9.07, 9.08, and 9.10 to 9.19 are retained since only one copy each of them appear as given in FIG. 24.

Data Sets that Create Error Conditions in P

The input data sets are assumed not to lead to error conditions during execution. If this assumption is incorrect, the occurrence of error conditions can be used to advantage for debugging (for example) P, by handling the blank { } in the if-then-else constructs as noted earlier.

Note that during program execution, the statements being executed will be flagged. When an error occurs, all the flagged statements are collated, function definition by function definition. If a statement, which is not a call to a function, carries a flag of the first type, then that is the statement where the program aborted. However, the main advantage of using collated statements is that a comparison between the collated statements and program P can provide helpful clues as to what caused the error condition. This, of course, must be done manually.

Several possibilities exist for optimizing the method outlined in this disclosure. For example, functions that do not contain any conditional statements in them can be separately handled. These functions can be separately handled as these functions can be directly placed in $P_R$ and, of these functions, those that are never called removed in the final editing of $P_R$.

Another optimizing possibility is when in statements such as:

if ( . . . ) { . . . }

The portion { . . . } in the above statement does not contain any conditional or branching statement and no variables are modified inside ( . . . ), then this code can be replaced by { . . . } in the extracted version.

Likewise, additional special cases may be identified and handled separately. However, the handling of special cases will usually make the coding of the restructuring tool more complex.

Computer Hardware and Software

Figure 25:
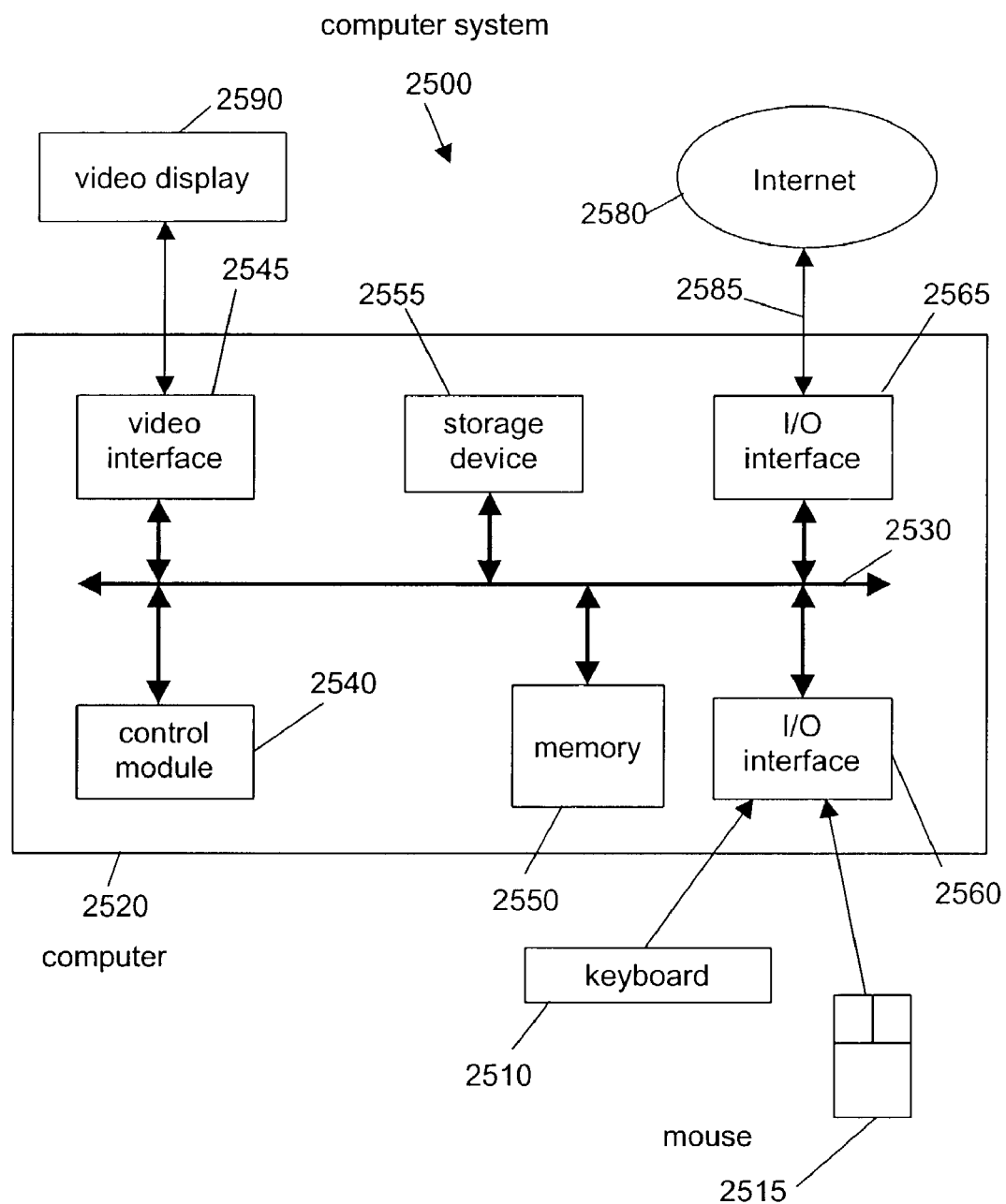
FIG. 25 is a schematic drawing of a computing system for performing the techniques described with reference to FIGS. 1 to 24.

FIG. 25 is a schematic representation of a computer system 2500 that can be used to perform steps in a process that implements the techniques described herein. The computer system 2500 is provided for executing computer software, which is programmed to assist in performing the described techniques. This computer software executes under a suitable operating system installed on the computer system 2500.

The computer software involves a set of programmed logic instructions that are able to be interpreted by the computer system 2500 for instructing the computer system 2500 to perform predetermined functions specified by those instructions. The computer software can be an expression recorded in any language, code or notation, comprising a set of instructions intended to cause a compatible information processing system to perform particular functions, either directly or after conversion to another language, code or notation.

The computer software is programmed by a computer program comprising statements in an appropriate computer language. The computer program is processed using a compiler into computer software that has a binary format suitable for execution by the operating system. The computer software is programmed in a manner that involves various software components, or code means, that perform particular steps in the process of the described techniques.

The components of the computer system 2500 include: a computer 2520, input devices 2510, 2515 and video display 2590. The computer 2520 includes: processor 2540, memory module 2550, input/output (I/O) interfaces 2560, 2565, video interface 2545, and storage device 2555.

The processor 2540 is a central processing unit (CPU) that executes the operating system and the computer software executing under the operating system. The memory module 2550 includes random access memory (RAM) and read-only memory (ROM), and is used under direction of the processor 2540.

The video interface 2545 is connected to video display 2590 and provides video signals for display on the video display 2590. User input to operate the computer 2520 is provided from input devices 2510, 2515 consisting of keyboard 2510 and mouse 2515. The storage device 2555 can include a disk drive or any other suitable non-volatile storage medium.

Each of the components of the computer 2520 is connected to a bus 2530 that includes data, address, and control buses, to allow these components to communicate with each other via the bus 2530.

The computer system 2500 can be connected to one or more other similar computers via a input/output (I/O) interface 2565 using a communication channel 2585 to a network 2580, represented as the Internet.

The computer software program may be provided as a computer program product, and recorded on a portable storage medium. In this case, the computer software program is accessed by the computer system 2500 from the storage device 2555. Alternatively, the computer software can be accessed directly from the network 2580 by the computer 2520. In either case, a user can interact with the computer system 2500 using the keyboard 2510 and mouse 2515 to operate the programmed computer software executing on the computer 2520.

The computer system 2500 is described for illustrative purposes: other configurations or types of computer systems can be equally well used to implement the described techniques. The foregoing is only an example of a particular type of computer system suitable for implementing the described techniques.

CONCLUSION

A method, a computer system, and computer software for restructuring computer programs are described herein. Those experienced in the techniques of compiler writing can implement the restructuring method since similar programming skills are required in both. While the described techniques are particularly of benefit in restructuring legacy computer codes for improved maintainability, the described techniques are also of use in restructuring modem codes to improve their robustness and for fixing programming errors.

Various alterations and modifications can be made to the techniques and arrangements described herein, as would be apparent to one skilled in the relevant art.

I claim:

1. A method of restructuring a source computer program to a target computer program, the method comprising the steps of:
defining a source computer program P that consists of source code, said source code of the source computer program P comprising a main function $F_0$ and a set of functions $\{F_1, F_2, \ldots F_r\}$, wherein $F_1, F_2, \ldots F_r$ are each a function other than the main function $F_0$ and are each adapted return a value to the main function $F_0$ as a result of being executed in response to being called by the main function $F_0$, wherein each function in the set of functions $\{F_1, F_2 \ldots F_r\}$ is external to the main program $F_0$ and comprises one or more statements and/or declarations, and wherein r is at least 1;
defining for said source computer program P, a set of tasks $T=\{T_1, T_2, T_n\}$ able to be performed by said source computer program P, wherein n is at least 1;
determining, for each task $T_i$ in said set of tasks T, a corresponding set of input data sets $U_i=\{u_{i1}, u_{i2}, \ldots u_{ip}\}$ for task $T_i$, wherein p is a function of i denoted as p(i) such that p(i) is at least 1, and wherein each input data set $u_{ij}$ in $U_i$ consists of an explicit data value of at least one variable in P; and
determining, for each set of input data sets $U_i=\{u_{i1}, u_{i2}, \ldots u_{ip}\}$ a corresponding set of programs $\{c_{i1}, c_{i2}, \ldots c_{ip}\}$ such that each program $c_{ij}$ in the set of programs $\{c_{i1}, c_{i2}, \ldots c_{ip}\}$ comprises declarations and executable statements from the source code of P required to execute task $T_i$ for input data set $u_{ij}$ in $U_i$;
processing each set of programs $\{c_{i1}, c_2, \ldots c_{ip}\}$ to generate a component $C_i$ adapted to execute the respective task $T_i$, said processing resulting in generation of a set of components $C=\{C_1, C_2, \ldots C_n\}$; and
generating a target computer program $P_R$ from the set of components C such that $P_R$ comprises a main program $H_0$ and a set of functions $H=\{H_1, H_2, \ldots H_n\}$, wherein the set of functions H is derived from the set of components C such that $H_1$ is derived from $C_i$ for i=1, 2, ... n, and wherein the main program $H_0$ comprises at least one conditional statement adapted to call each function $H_i$ in the set of functions H to execute the task $T_i$ upon the at least one conditional statement encountering the task $T_i$.

2. The method as claimed in claim 1, further comprising the step of: converting all statements of said functions $\{F_0, F_1, F_2, \ldots F_r\}$ of said source computer program P having a same logical functionality but a different form to a same predetermined canonical form, and wherein said source computer program P comprise a first and second group of statements having a same logical functionality but a different form.

3. A method of restructuring a source computer program to a target computer program, the method comprising the steps of:
defining a source computer program P that consists of source code, said source code of the source computer program P comprising a set of functions $\{F_0, F_1, F_2, \ldots F_r\}$ each function of which comprises one or more statements and/or declarations;
defining for said source computer program P, a set of tasks $T=\{T_1, T_2, \ldots T_n\}$ able to be performed by said source computer program P;
determining, for each of the tasks $T_i$ in said set of tasks T, a corresponding set of input data sets $U_i=\{u_{i1}, u_{i2}, \ldots u_{ip}\}$ for task $T_i$;
restructuring said source computer program P into a target computer program $P_R$ that consists of source code, said source code of the target computer program $P_R$ comprising a set of components $\{C_1, C_2, \ldots C_{il}\}$ with reference to the interaction of said input data sets $U_i$ with said set of tasks T, wherein each component $C_i$ of said set of components of said target computer program $P_R$ consists of source code that contains declarations and executable statements that are extracted from the source code of said source computer program P and required to execute the respective task $T_i$ of said source computer program P corresponding with the component $C_i$;
interpreting said source computer program P with each of said input data sets $U_i$ related to respective tasks $T_i$; and
flagging each interpreted statement of said source computer program P with one or more predetermined flags.

4. The method as claimed in claim 3, wherein said predetermined flags include:
(i) a first flag that indicates that the flagged statement has started execution;
(ii) a second flag that indicates that the flagged statement has finished execution; and
(iii) a third flag that indicates that the flagged statement has executed one or more times previously during execution of the source computer program P with the same input data $u_{ij}$.

5. The method as claimed in claim 1, wherein said set of input data sets $U_i=\{u_{i1}, u_{i2}, \ldots u_{ip}\}$ collectively provide complete coverage of all possible activities within task $T_i$ for fully executing respective task $T_i$.

6. The method as claimed in claim 1, wherein data boundaries for task $T_i$ are known to a user, and said data boundaries are accounted for in respective set of input data sets $U_i$ such that activities pertinent to respective task $T_i$ alone and no other are executed.

7. The method as claimed in claim 1, wherein none of the input data sets $\{u_{i1}, u_{i2}, \ldots u_{ip}\}$ of the set of input data sets $U_i$ creates error conditions when used as input to the respective task $T_i$ of said source computer program P.

8. The method as claimed in claim 1, wherein said target computer program $P_R$ comprises a function $M_R$ that is a restructured main function for said target computer program $P_R$ whose principal task is to ascertain which task the user wishes to invoke and ensure the execution of the corresponding component $C_i$ to execute the task.

9. The method as claimed in claim 1, wherein each of said components $C_i$ comprises a respective set of functions $\{F_{0i}, F_{1i}, F_{2i}, \ldots F_{ri}\}$ in which (i) $F_{0i}$ contains all declarations and executable statements extracted from function $F_0$ in the context of executing respective task $T_i$ and (ii) each $F_{ki}$ for $k>0$ contains all declarations and executable statements extracted from respective function $F_k$.

10. The method as claimed in claim 1, wherein the structure of said target computer program $P_R$ is such that if a task $T_j$ of said source computer program P is changed or removed, the corresponding respective component $C_j$ and function $F_{0j}$ of the target computer program is changed or removed.

11. The method as claimed in claim 1, further comprising the step of: manually optimizing the target computer program $P_R$.

12. The method as claimed in claim 11, wherein said manually optimizing comprises making each task of the set of tasks T run faster via the target computer program $P_R$ than via the source computer program P.

13. The method of claim 1, wherein p(1) is at least 2.

14. The method of claim 13, wherein $c_{12}=c_{11}$, and wherein said processing comprises eliminating $c_{11}$ such that the component $C_1$ includes statements and/or declarations from $c_{12}$ and not from $c_{11}$.

15. The method of claim 13, wherein $c_{11}$ comprises a function $f_1$f, wherein $c_{12}$ comprises a function $f_2$, wherein $f_1=f_2$, and wherein said processing comprises eliminating $f_1$ such that the component $C_1$ includes $f_2$ and does not include $f_1$.

16. The method of claim 13, wherein $c_{11}$ comprises a function $f_1$, wherein $c_{12}$ comprises a function $f_2$, wherein $f_1$ and $f_2$ have common declarations and different bodies, and wherein said processing comprises merging $f_1$ and $f_2$ to generate a function $f_3$ that comprises the bodies of $f_1$ and $f_2$ merged together and the declarations of $f_1$ and $f_2$ merged together such that the common declarations of only $f_1$ and not of $f_2$ appear in the merged declarations of $f_3$.

17. The method of claim 1, wherein n is at least 2, and wherein p(2) is unequal to p(1).

18. The method of claim 1, wherein n is at least 2, and wherein said generating the target computer program $P_R$ comprises merging N functions within the set of components C into M functions within the set of functions H such that M is less than N.

19. The method of claim 1, wherein the least one conditional statement comprises an if-then-else statement.

20. The method of claim 1, wherein the least one conditional statement encounters the task $T_i$ upon the determining that a task identification variable (task_id) matches an identifier of the task $T_i$.

21. A computer system comprising a processor and a computer readable memory unit coupled to the processor, said memory unit containing instructions that when executed by the processor implement the method of claim 1.

22. A computer program product, comprising a computer usable medium having a computer readable program code embodied therein, said computer readable program code containing instructions that when executed by a processor of a computer system implement the method of claim 1.

* * * * *